US00RE48932E

(19) United States
(12) Reissued Patent
Katagiri et al.

(10) Patent Number: US RE48,932 E
(45) Date of Reissued Patent: Feb. 15, 2022

(54) FRAME GENERATING APPARATUS AND FRAME GENERATING METHOD

(71) Applicant: FUJITSU LIMITED, Kawasaki (JP)

(72) Inventors: Toru Katagiri, Kawasaki (JP); Masahiro Shioda, Kawasaki (JP)

(73) Assignee: FUJITSU LIMITED, Kawasaki (JP)

(21) Appl. No.: 15/873,448

(22) Filed: Jan. 17, 2018

Related U.S. Patent Documents

Reissue of:
(64) Patent No.: 8,675,684
Issued: Mar. 18, 2014
Appl. No.: 12/719,277
Filed: Mar. 8, 2010

U.S. Applications:
(63) Continuation of application No. 15/072,838, filed on Mar. 17, 2016, now Pat. No. Re. 47,127.

(30) Foreign Application Priority Data

Mar. 9, 2009 (JP) ..... 2009-055448

(51) Int. Cl.
*H04J 3/16* (2006.01)
*H04J 3/07* (2006.01)

(52) U.S. Cl.
CPC ..... *H04J 3/1652* (2013.01); *H04J 3/076* (2013.01); *H04J 3/1664* (2013.01)

(58) Field of Classification Search
CPC ..... H04J 3/076; H04J 3/1652; H04J 3/1664; H04J 14/0204; H04J 14/0205;
(Continued)

(56) References Cited

U.S. PATENT DOCUMENTS 5,390,180 A 2/1995 Reilly
6,882,662 B2 4/2005 Subrahmanyan
(Continued)

FOREIGN PATENT DOCUMENTS

CN 1773898 5/2006
CN 1773898 A 5/2006
(Continued)

OTHER PUBLICATIONS

United States Patent and Trademark Office, Final Rejection mailed in connection with U.S. Appl. No. 15/072,838 dated Feb. 13, 2018.
(Continued)

*Primary Examiner* — Charles R Craver
(74) *Attorney, Agent, or Firm* — Fujitsu Patent Center

(57) ABSTRACT

A frame generating apparatus accommodating a client signal in an optical data transfer unit frame with a higher bit rate than the client signal includes a deserializer, a plurality of generic mapping procedure circuits, and a serializer. The deserializer deserializes the client signal into parallel signals, the number of parallel signals corresponding to the number of tributary slots used in the optical data transfer unit frame. The plurality of generic mapping procedure circuits inserts data and stuff into a frame accommodating portion of the optical data transfer unit frame based on a difference in the bit rate between the client signal and the optical data transfer unit frame. The serializer serializes the parallel signals output from the plurality of generic mapping procedure circuits.

15 Claims, 16 Drawing Sheets

(58) Field of Classification Search
CPC ..... H04J 14/0227; H04J 14/0267; H04Q 11/0478; H04Q 11/0003; H04Q 2011/005; H04Q 2011/0064; H04Q 2011/0088
See application file for complete search history.

(56) References Cited

U.S. PATENT DOCUMENTS

| | | | | |
|---|---|---|---|---|
| 7,020,094 | B2 | 3/2006 | Heiles | |
| 7,729,617 | B2 * | 6/2010 | Sheth et al. | 398/135 |
| 7,894,482 | B1 | 2/2011 | Wu | |
| 8,204,087 | B2 | 6/2012 | Shin | |
| 8,274,892 | B2 | 9/2012 | Chiang | |
| 8,638,683 | B2 | 1/2014 | Honma | |
| 8,743,915 | B2 | 6/2014 | Shin | |
| 8,824,505 | B2 | 9/2014 | Dong | |
| 8,958,514 | B2 | 2/2015 | Bruckman | |
| 8,989,222 | B1 | 3/2015 | Mok | |
| 9,160,478 | B2 | 10/2015 | Roorda | |
| 2005/0286521 | A1 | 12/2005 | Chiang et al. | |
| 2006/0104309 | A1 * | 5/2006 | Vissers et al. | 370/474 |
| 2007/0053384 | A1 | 3/2007 | Roberts | |
| 2007/0248121 | A1 | 10/2007 | Zou | |
| 2008/0075113 | A1 | 3/2008 | Harley et al. | |
| 2009/0046745 | A1 * | 2/2009 | Shin et al. | 370/535 |
| 2014/0334503 | A1 | 11/2014 | Dong | |

FOREIGN PATENT DOCUMENTS

| | | | |
|---|---|---|---|
| CN | 101217334 | A | 7/2008 |
| CN | 101217334 | | 7/2012 |
| JP | 2008-113394 | | 5/2008 |
| JP | 2008-113394 | A | 5/2008 |
| JP | 2008-113395 | | 5/2008 |
| JP | 2008-113395 | A | 5/2008 |

OTHER PUBLICATIONS

USPTO, Notice of Allowance dated Aug. 6, 2018 for related U.S. Appl. No. 15/072,838 [pending].
Canadian Intellectual Property Office, Canadian Office Action dated Apr. 18, 2012, from corresponding Canadian Patent Application No. 2695882.
CN Office Action, Notification of the First Office Action dated May 29, 2012, from corresponding to Chinese Application No. 201010128809.4 with Partial English-language Translation.
CN Office Action, 2nd Notification of Office Action dated Jan. 5, 2013, from corresponding Chinese Application No. 201010128809.4 with English language translation.
Office Action, Non-Final Office Action, mailed in connection with U.S. Appl. No. 12/719,277 (now U.S. Pat. No. 8,675,684); USPTO, dated Mar. 8, 2012.
Office Action, Notice of Allowance, mailed in connection with U.S. Appl. No. 12/719,277 (now U.S. Pat. No. 8,675,684); USPTO, dated Aug. 17, 2012.
CNOA—The Office Action of Divisional Chinese Application No. 201310445570.7 dated Aug. 20, 2015 with English Translation.
The extended European search report of European Application No. 10155460.8 dated Nov. 27, 2015.
EPOA—The Official Communication of European Application No. 10155460.8 dated Nov. 10, 2016.
Maarten, "Draft revised G.709(version 02)", ITU-T Draft; Study Period 2005-2008, International Telecommunication Union, Geneva; CH, vol. 11, Dec. 9, 2008, pp. 1-58, XP017535976.
Maarten Vissers Huawei Technologies Co., Ltd., "Proposals to extend G.709", ITU-T Draft; Study Period 2009-2012, International Telecommunication Union, Geneva; CH, vol. 11/15, Nov. 20, 2008, pp. 1-23, XP017446806.
EPOA—Official Communication of European Patent Application No. 10155460.8 dated Jun. 7, 2017.
International Telecommunication Union, "Interfaces for the Optical Transport Network (OTN)", Recommendation G.709/Y.1331, Mar. 2003, International Telecommunication Union.
United States Patent and Trademark Office, Notice of Allowance mailed in connection with U.S. Appl. No. 12/719,277 (now U.S. Pat. No. 8,675,684); USPTO, dated Aug. 1, 2013.
United States Patent and Trademark Office, Notice of Allowance mailed in connection with U.S. Appl. No. 12/719,277 (now U.S. Pat. No. 8,675,684); USPTO, dated Nov. 6, 2013.
United States Patent and Trademark Office, Non-Final Office Action mailed in connection with U.S. Appl. No. 15/072,838; USPTO, dated Oct. 18, 2017 (pending).
Partial English-Translation of foreign reference CN 101217334 A, issued on Jul. 9, 2008.

* cited by examiner

FIG. 3

| No. | ODU4 CLIENT | CLIENT BIT RATE [Gbps] | MULTIPLEXING NUMBER ON ODU4 | BIT RATE AFTER MULTIPLEXING [Gbps] | STANDARD RECOMMENDATION |
|---|---|---|---|---|---|
| 1 | 100GbE | 103.1250 | 1 | 103.1250 | IEEE802.3ba |
| 2 | ODU3 | 40.3192 | 2 | 80.6384 | ITU-T G.709 |
| 3 | ODU2e | 10.3995 | 10 | 103.9953 | ITU-T G.sup43 |
| 4 | ODU2 | 10.0373 | 10 | 100.3727 | ITU-7 G.709 |
| 5 | ODU1 | 2.4988 | 40 | 99.9510 | ITU-T G.709 |
| 6 | ODU0 | 1.2442 | 80 | 99.5328 | UNRECOMMENDED |

OMFI bit 2345678
FRAME (n=1...40)
COLUMN
xxxxxx0
2n-1
xxxxxx1
2n
OMFI
RES
RES
PSI
JOH
TS#01
TS#02
TS#41
TS#42
TS#40
TS#80
OPY4 PAYLOAD (4 x 3808 bytes)
FIXED STUFF
1
15
16
17
18
56
57
58
96
97
98
3776
3777
3778
3816
3824
TS#01 TO #4048 COLUMNS
TS#41 TO #8047 COLUMNS
TS#01 TO #4047 COLUMNS
TS#41 TO #8048 COLUMNS OMFI bits 2345678
0000000
0000001
1001111
OPU4 FOR TS #i
ODTU OF TS#1 TO #40 (IN 1TS)
ODTU OF TS#41 TO #80 (IN 1TS)
47
48

FRAME GENERATING APPARATUS AND FRAME GENERATING METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This *is notice that there is more than one application for reissue of U.S. Pat. No. 8,675,684 issued on Mar. 18, 2014; this* application*, application Ser. No. 15/873,448 filed on Jan. 17, 2018, is a continuation reissue of application Ser. No. 15/072,838 filed on Mar. 17, 2016, which issued as U.S. Pat. No. RE47,127 on Nov. 13, 2018; U.S. Pat. No. RE47, 127 (application Ser. No. 15/072,838) is a reissue of application Ser. No. 12/719,277 filed on Mar. 8, 2010, which issued as U.S. Pat. No. 8,675,684 on Mar. 8, 2014; U.S. Pat. No. 8,675,684* is based upon and claims the benefit of priority of the prior Japanese Patent Application No. 2009-55448, filed on Mar. 9, 2009, the entire contents of which are incorporated herein by reference.

FIELD

The present invention relates to a frame generating apparatus and a frame generating method.

BACKGROUND

In optical networks applying wavelength division multiplexing (WDM), an optical transport network (OTN) has been standardized as a framework. In the OTN, a plurality of types of client signals may be accommodated, and large-volume transmission may be performed. Japanese Laid-open Patent Publication No. 2008-113394 discloses an optical transmission system in which client signals are transmitted while being accommodated or multiplexed in optical transfer unit (OTU) frames in the OTN.

A difference in bit rate between an accommodated signal and a frame signal that accommodates the signal is compensated by asynchronously mapping the accommodated signal to the frame signal (asynchronous mapping procedure (AMP)). However, with an increase in bit rate and diversification of accommodated signals, generic mapping procedure (GMP) is being adopted. In the GMP, the number of pieces of data and the number of pieces of stuff to be accommodated in a frame accommodating portion are determined based on a difference in bit rate between an accommodated signal and a frame signal that accommodates the signal. The GMP is disclosed in U.S. Pat. No. 7,020,094.

For adopting the GMP and accommodating a frame signal that accommodates a signal in a frame signal having a bit rate higher than that of the frame signal, generation of optical data transfer unit (ODTU) frames is required.

SUMMARY

According to an aspect of an embodiment, a frame generating apparatus for accommodating a client signal in an optical data transfer unit frame with a higher bit rate than the client signal includes a deserializer, a plurality of GMP circuits, and a serializer. The deserializer deserializes the client signal into parallel signals, the number of parallel signals corresponding to the number of tributary slots used in the optical data transfer unit frame. The plurality of GMP circuits inserts data and stuff into a frame accommodating portion of the optical data transfer unit frame based on a difference in bit rate between the client signal and the optical data transfer unit frame. The serializer serializes the parallel signals output from the plurality of GMP circuits.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 is a diagram illustrating main types of client signals to be accommodated in OTU4/ODU4/OPU4;

DESCRIPTION OF EMBODIMENTS

Hereinafter, an embodiment will be described with reference to the accompanying drawings.

Figure 1:
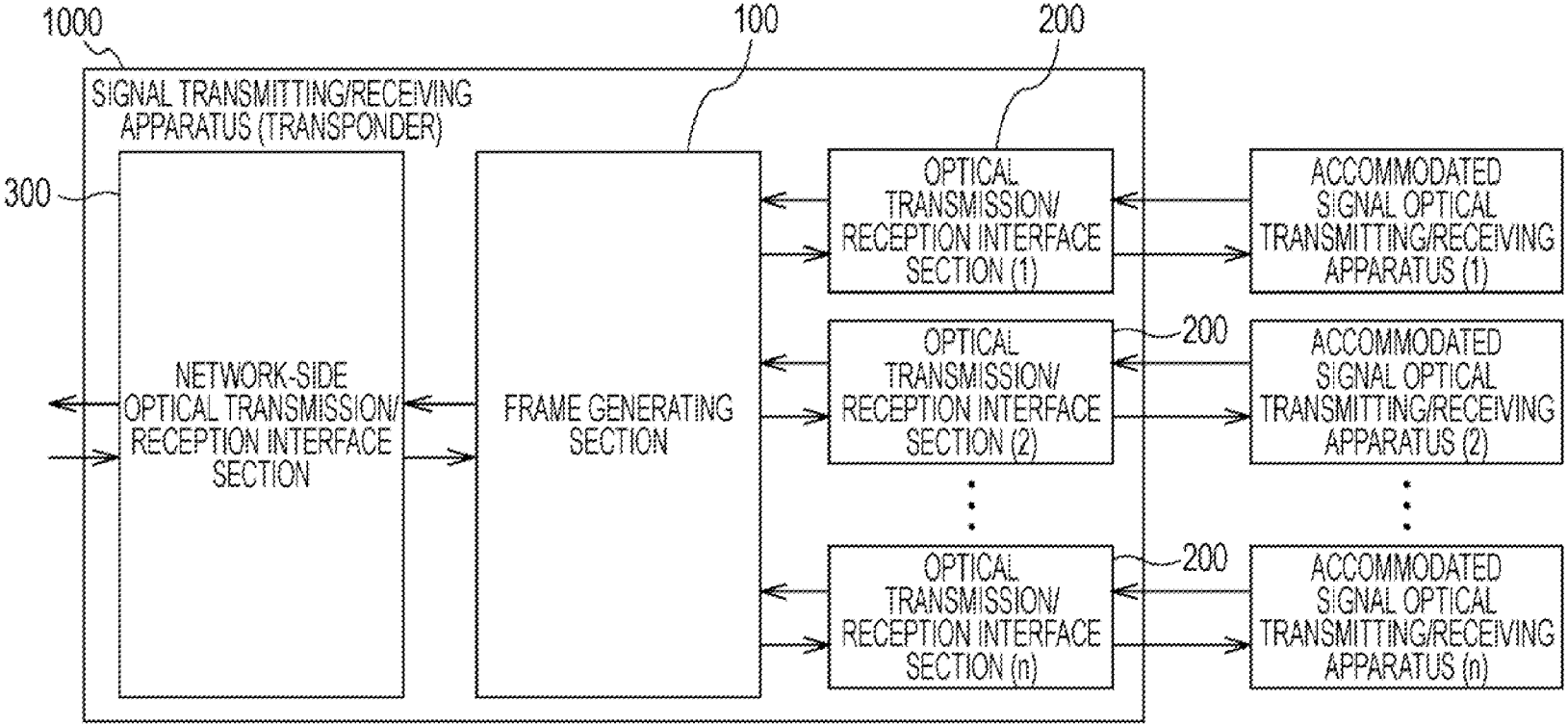
FIG. 1 is a block diagram illustrating a configuration of a signal transmitting/receiving apparatus to which a frame generating section according to an embodiment is applied.

FIG. 1 is a block diagram illustrating a configuration of a signal transmitting/receiving apparatus 1000 which includes a frame generating section 100 according to an embodiment. The signal transmitting/receiving apparatus 1000 includes the frame generating section 100, a plurality of optical transmission/reception interface sections 200, and a network-side optical transmission/reception interface section 300.

The frame generating section 100 receives client signals via the optical transmission/reception interface sections 200 and generates OTU frames. Here, an input/output section of each of the optical transmission/reception interface sections 200 is called a tributary port. The signal transmitting/receiving apparatus 1000 includes "n" number of tributary ports t. The OTU frames generated by the frame generating section 100 are transmitted to a network via the optical transmission/reception interface section 300. On the other hand, the frame generating section 100 receives OTU frames via the optical transmission/reception interface section 300. The frame generating section 100 extracts client signals from the received OTU frames. The extracted client signals are transmitted to the outside via the optical transmission/reception interface sections 200.

Figure 2:
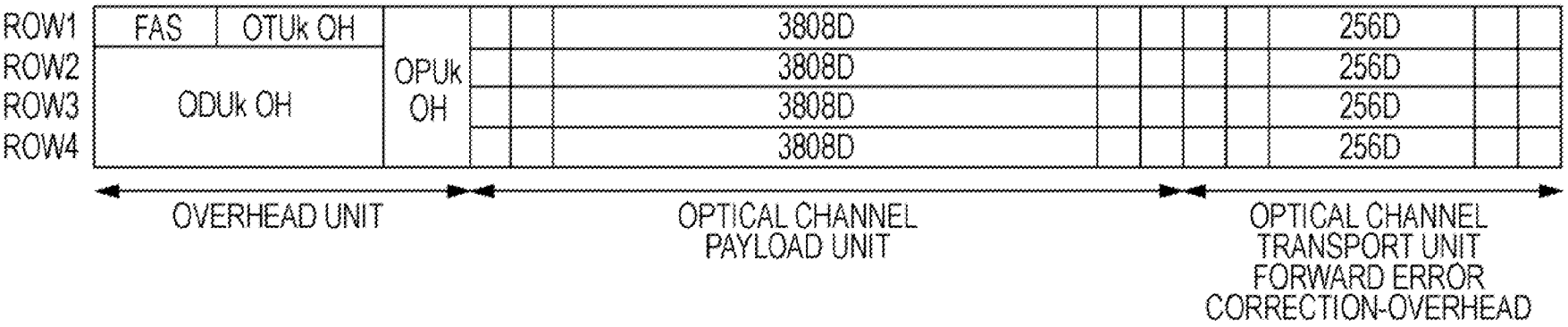
FIG. 2 is a diagram illustrating a format of an OTU frame.

FIG. 2 is a diagram illustrating a format of an OTU frame. The OTU frame includes an overhead unit, an optical channel payload unit (OPUk), and an optical channel transport unit forward error correction-overhead (OTUk FEC-OH).

The overhead unit has a frame size of 16 bytes×4 rows in the 1st to 16th columns, and is used for connection and quality management. The OPUk has a frame size of 3808 bytes×4 rows in the 17th to 3824th columns, and accommodates client signals for providing one or more services. The OTUk FEC-OH has a frame size of 256 bytes×4 rows in the 3825th to 4080th columns, and is used to correct errors that may occur during transmission.

By adding overhead bytes used for connection and quality management to the OPUk, an optical channel data unit (ODUk) is generated. Also, by adding overhead bytes used for frame synchronization, connection, quality management, etc. and the OTUk FEC-OH to an ODUj unit, an optical channel transport unit (OTUk) is generated.

In this embodiment, a description will be given about generation of OTN frames for accommodating and transmitting an ETHERNET signal having a bit rate of 100 Gbps and various signals that may be accommodated in the conventional OTN. Hereinafter, OTN frames corresponding to 100 Gbps are called OTU4/ODU4/OPU4.

FIG. 3 is a diagram illustrating main types of client signals accommodated in the OTU4/ODU4/OPU4. A 100 Gb ETHERNET (hereinafter referred to as 100 GbE) having a bit rate of 103.125 Gbps is accommodated in a payload unit of the OTU4/ODU4/OPU4 without being multiplexed. ODU3, ODU2, and ODU1, which are ODUj described in ITU-T G. 709 as an existing OTN frame, or ODU2e described in ITU-T G. supplement 43 is accommodated in the payload unit of the OTU4/ODU4/OPU4 by being multiplexed.

Figures 4A, 4B:
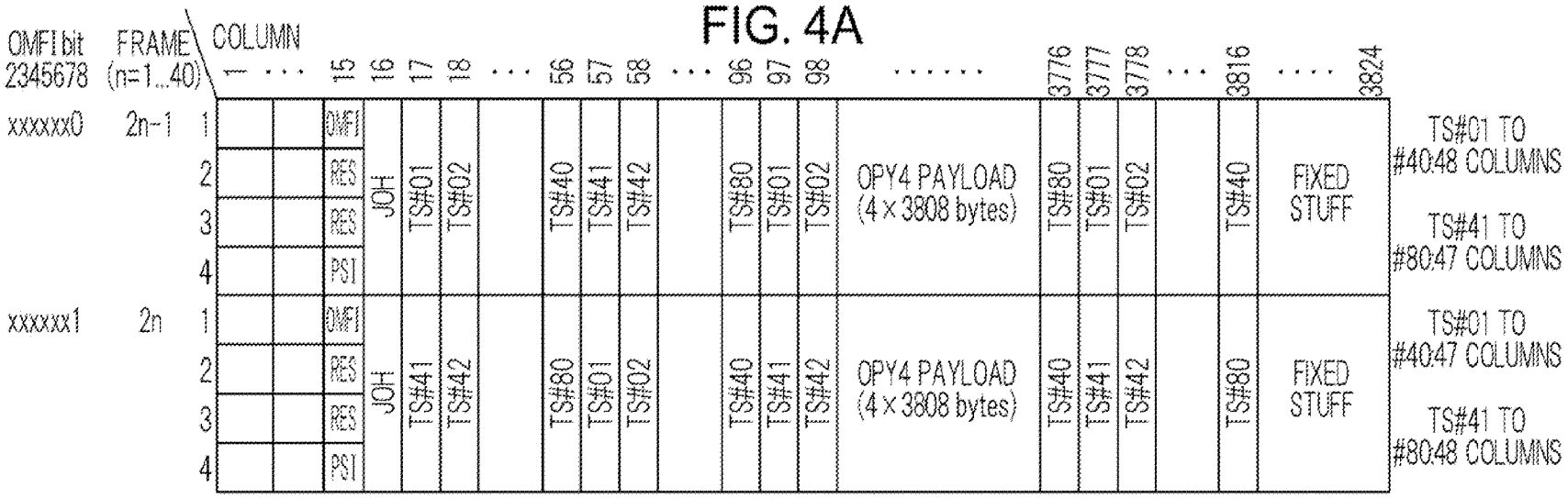
FIGS. 4A and 4B are diagrams illustrating an example of a frame structure of OTU4/ODU4/OPU4 when multiplexing and accommodating a plurality of ODUj's.

FIGS. 4A and 4B are diagrams illustrating an example of a frame structure of the OTU4/ODU4/OPU4 when accommodating a plurality of ODUj (j=0, 1, 2, 2e, 3, 3e1, and 3e2) by multiplexing. The frame generating section 100 inserts first fixed stuff bytes of 8+40n ("n" is an integer of 0 or more) bytes×4 rows into the payload unit of OPU4.

In FIGS. 4A and 4B, it is assumed that n=0 for simplifying the description. 80 types of tributary slots realize a bit rate of 100 Gbps. The bit rate of each tributary slot is 1.301709251 Gbps.

Referring to FIG. 4A, the frame generating section 100 inserts the first fixed stuff bytes into 8 columns×4 bytes in the 3817th to 3824th columns in an ODU4 frame. The frame generating section 100 accommodates, in an area other than the first fixed stuff bytes in each OPU4 frame, 47.5 sets of tributary slots, each set including 80 types of tributary slots in which 1 byte×4 rows is one unit. The frame generating section 100 accommodates 48 sets of tributary slots 1 to 40 and 47 sets of tributary slots 41 to 80 in an odd-numbered OTU frame. Also, the frame generating section 100 accommodates 47 sets of tributary slots 1 to 40 and 48 sets of tributary slots 41 to 80 in an even-numbered OTU frame. The frame generating section 100 performs a process by regarding 80 types of OTU frames as one multi-frame cycle when accommodating a plurality of types of signals in OTU frames.

In an odd-numbered OTU frame, a tributary slot 1 (Tribslot#1) is assigned to the 17th, 97th, . . . , and 3777th columns in an ODUj frame. In an even-numbered OTU frame, a tributary slot 1 (Tribslot#1) is assigned to the 57th, 137th, . . . , and 3737th columns in an ODUj frame. Also, in an odd-numbered OTU frame, a tributary slot 80 (Tribslot#80) is assigned to the 96th, 176th, . . . , and 3776th columns in an ODUj frame. In an even-numbered OTU frame, a tributary slot 80 (Tribslot#80) is assigned to the 56th, 136th, . . . , and 3816th columns in an ODUj frame.

Figure 5:
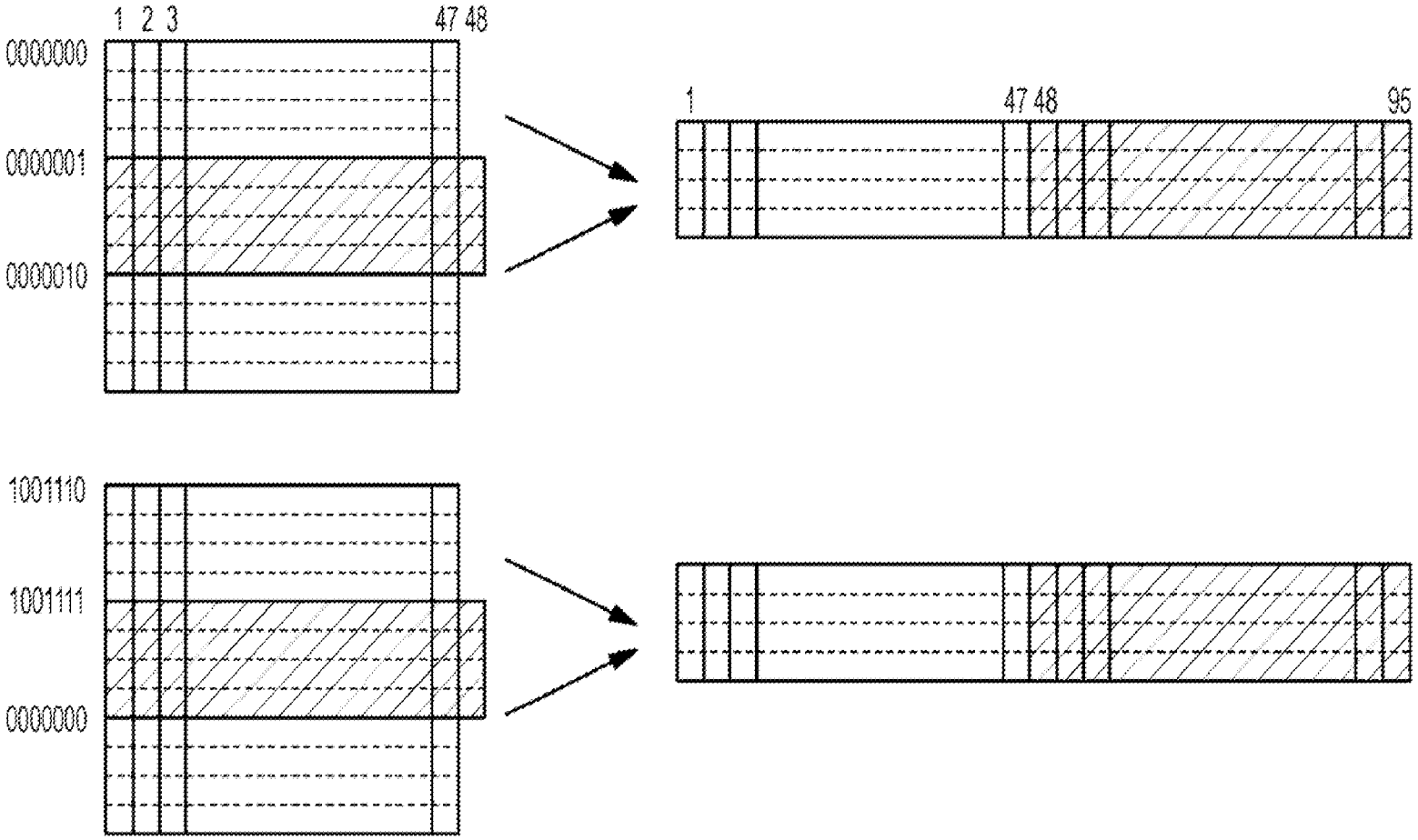
FIG. 5 is a diagram illustrating a process performed by regarding two frames as one unit.

As illustrated in FIG. 4B, the column size of tributary slots varies in each frame. Specifically, 48 columns of tributary slots #1 to #40 are accommodated in an odd-numbered OTU frame, and 47 columns of tributary slots #1 to #40 are accommodated in an even-numbered OTU frame. On the other hand, 47 columns of tributary slots #41 to #80 are accommodated in an odd-numbered OTU frame, and 48 columns of tributary slots #41 to #80 are accommodated in an even-numbered OTU frame. Thus, in this embodiment, a process is performed by regarding two frames as one unit, as illustrated in FIG. 5. Accordingly, the column size of each unit may be the same.

Figure 6:
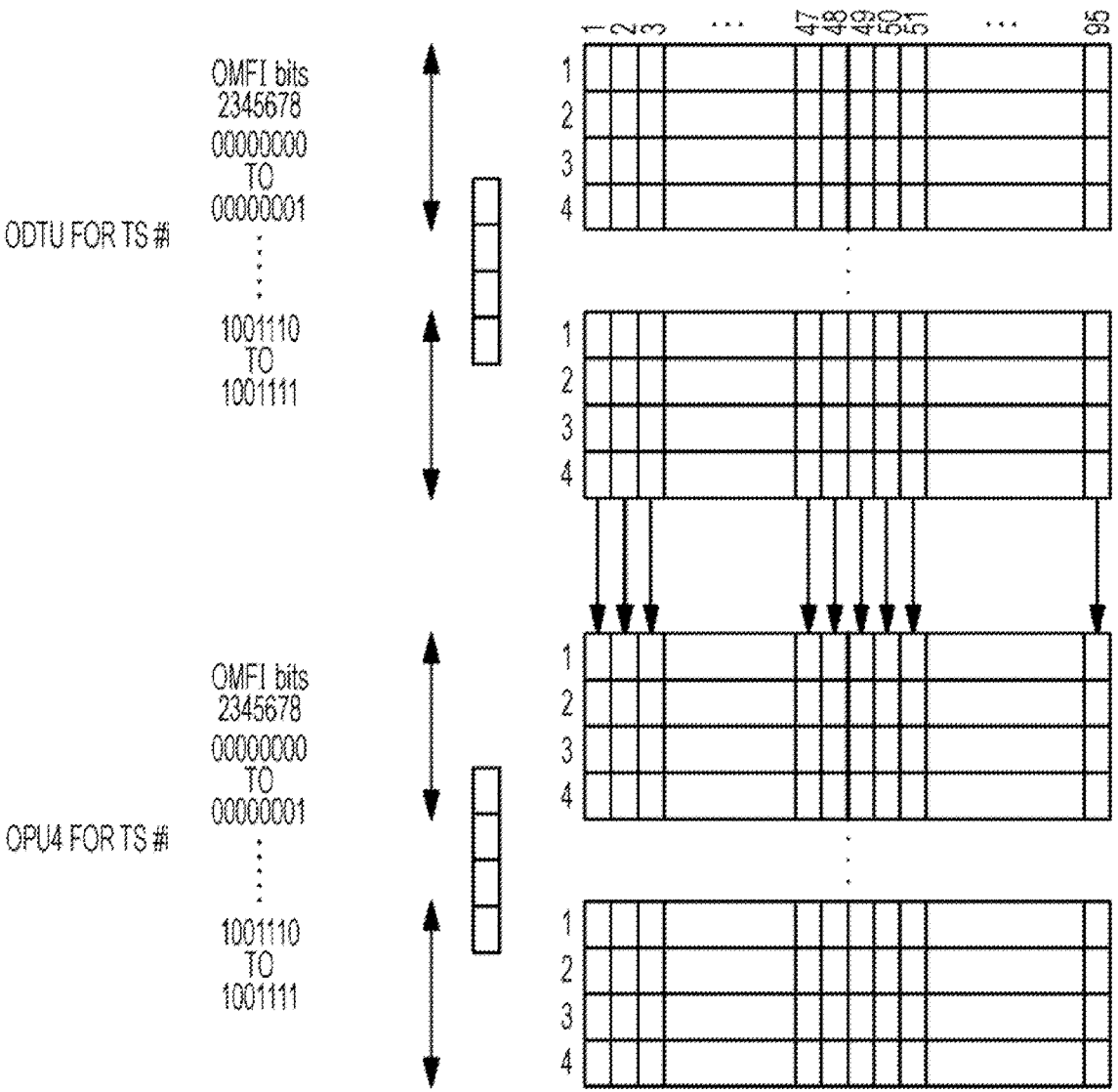
FIG. 6 is a diagram illustrating mapping when an ODU0 signal is accommodated in ODU4.

Next, a description will be given about mapping when accommodating an ODUj signal in ODU4. FIG. 6 is a diagram illustrating mapping when accommodating an ODU0 signal in ODU4. Referring to FIG. 6, the frame generating section 100 uses one set of tributary slots when accommodating one ODU0 signal in ODU4.

Figure 7:
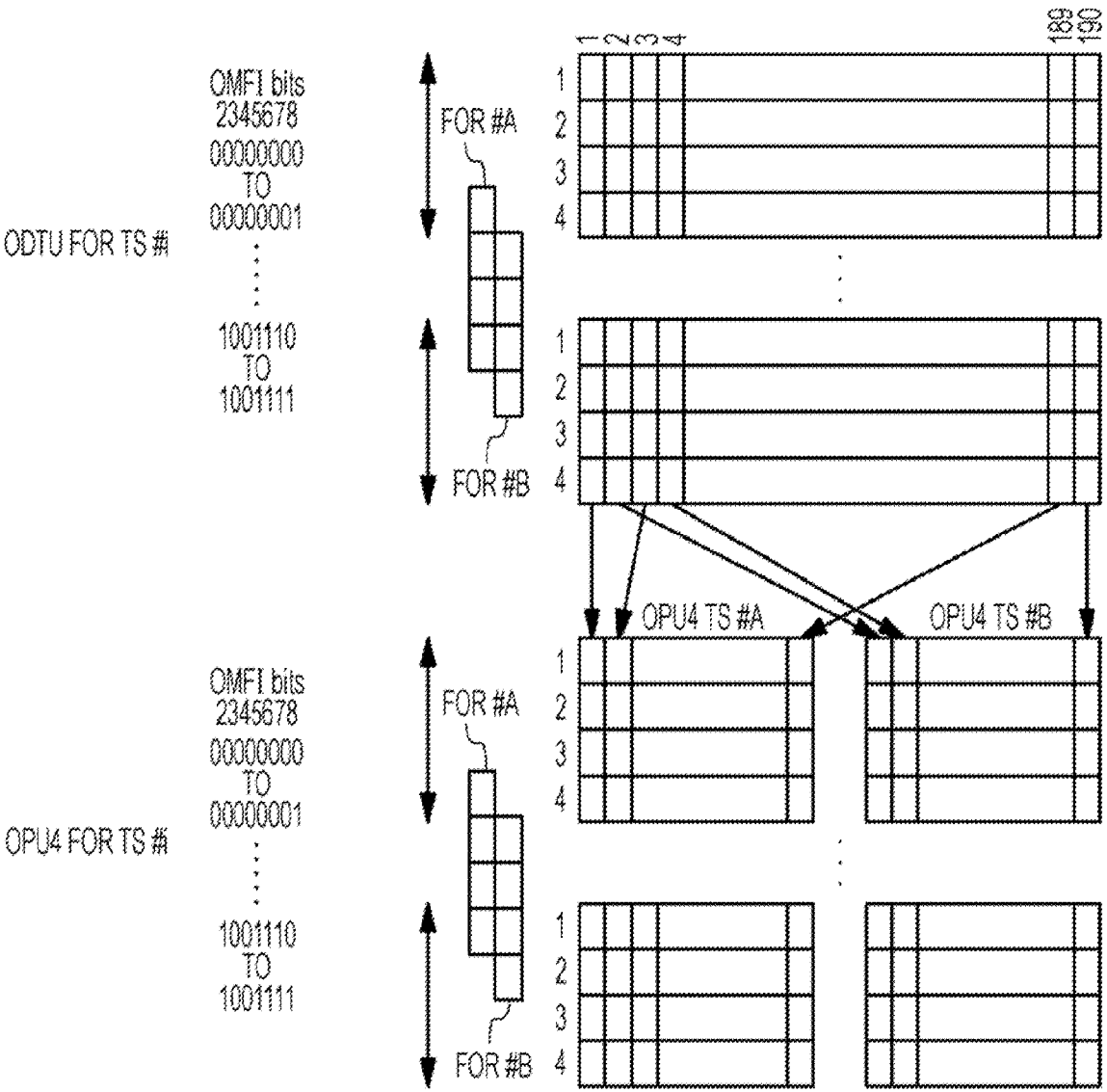
FIG. 7 is a diagram illustrating mapping when an ODU1 signal is accommodated in ODU4.

FIG. 7 is a diagram illustrating mapping when accommodating an ODU1 signal in ODU4. Referring to FIG. 7, the frame generating section 100 uses two sets of tributary slots when accommodating one ODU1 signal in ODU4.

Figure 8:
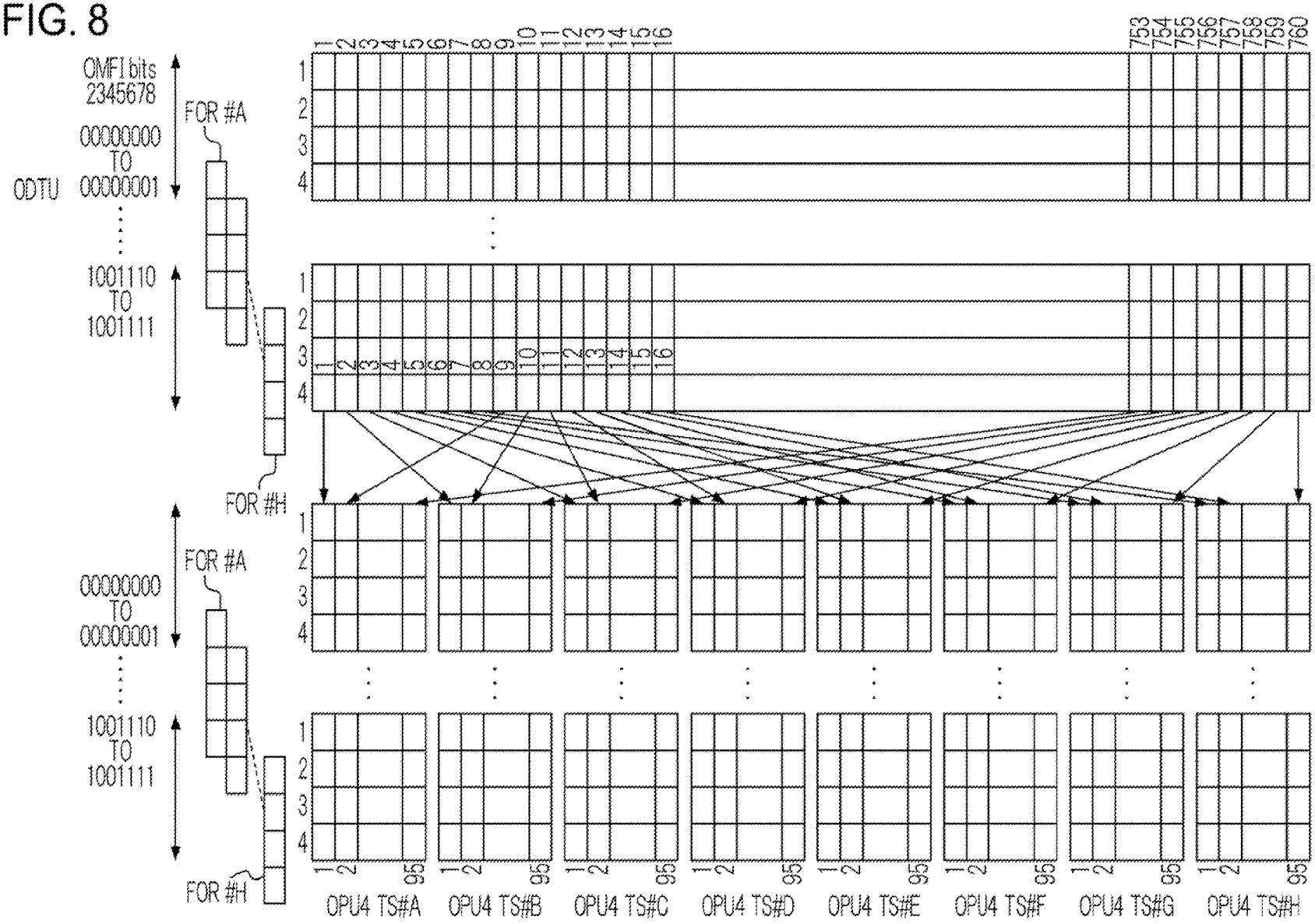
FIG. 8 is a diagram illustrating mapping when an ODU2 or ODU2e signal is accommodated in ODU4.

FIG. 8 is a diagram illustrating mapping when accommodating an ODU2 signal or an ODU2e signal in ODU4. Referring to FIG. 8, the frame generating section 100 uses eight sets of tributary slots when accommodating one ODU2 or ODU2e signal in ODU4.

Figure 9:
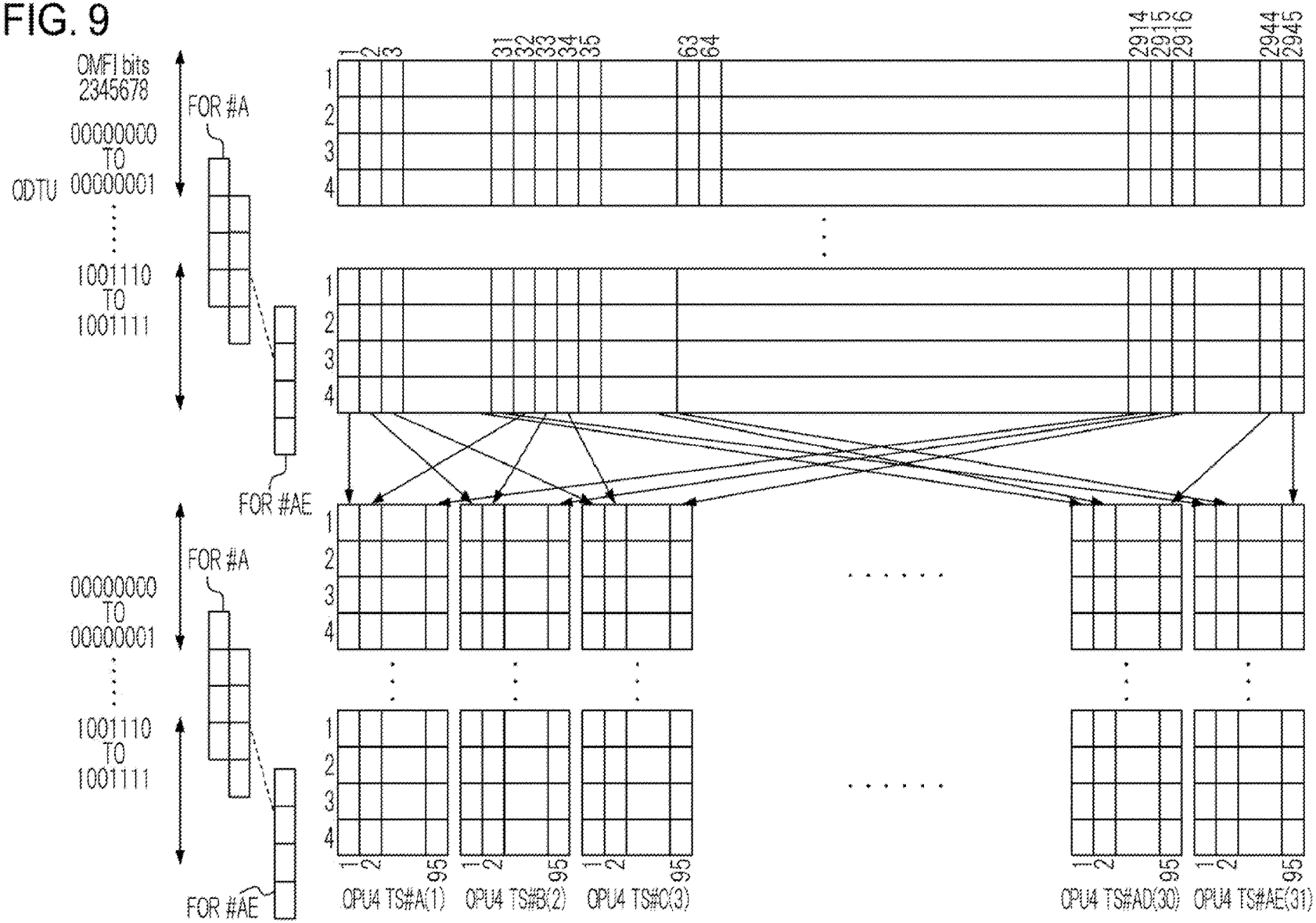
FIG. 9 is a diagram illustrating mapping when an ODU3 signal is accommodated in ODU4.

FIG. 9 is a diagram illustrating mapping when accommodating an ODU3 signal in ODU4. Referring to FIG. 9, the frame generating section 100 uses thirty-one sets of tributary slots when accommodating one ODU3 signal in ODU4. Additionally, when accommodating an ODUj signal in ODU4 by using an arbitrary number of sets of tributary slots, the mapping described above may be applied.

Figure 10:
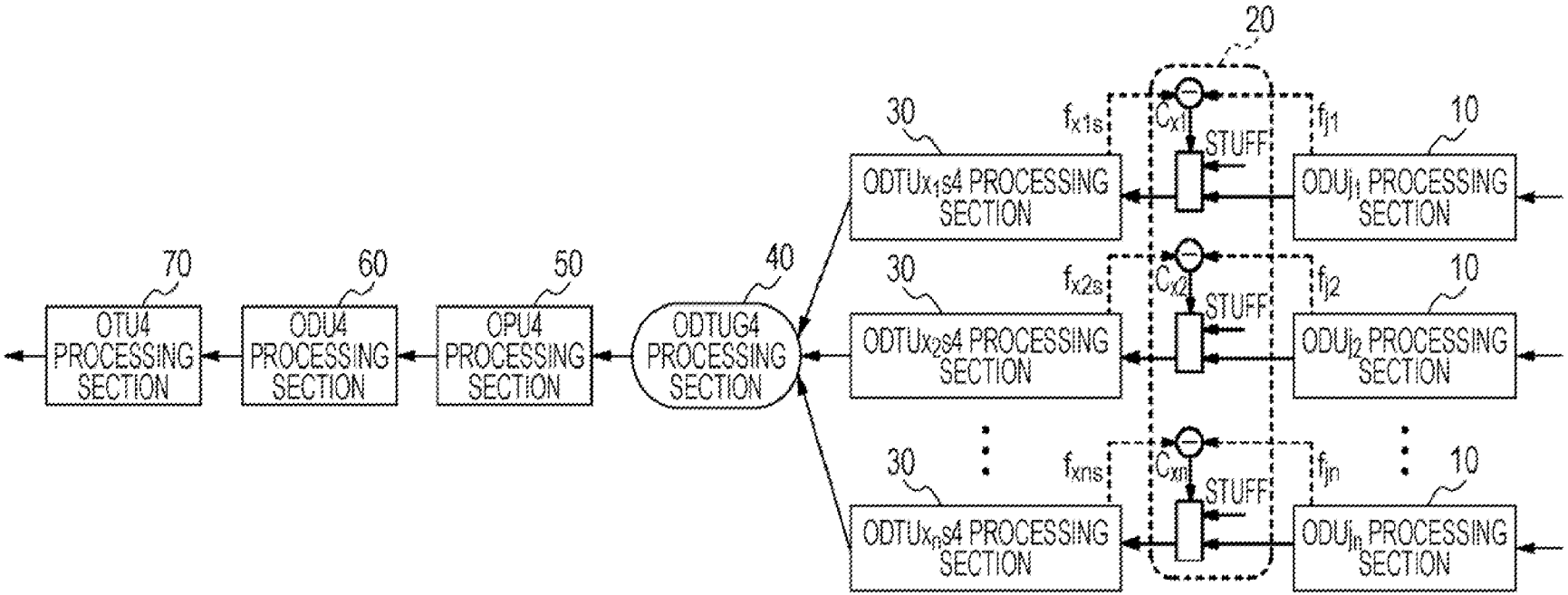
FIG. 10 is a block diagram illustrating details of the frame generating section.

Next, details of the frame generating section 100 will be described. FIG. 10 is a block diagram illustrating the details of the frame generating section 100. Referring to FIG. 10, the frame generating section 100 includes a plurality of ODUj processing sections 10, a GMP processing section 20, a plurality of ODTU processing sections 30, an ODTUG4 processing section 40, an OPU4 processing section 50, an ODU4 processing section 60, and an OTU4 processing section 70.

Each of the ODUj processing sections 10 receives a client signal, which is an accommodated signal, from the corresponding optical transmission/reception interface section 200. The GMP processing section 20 determines the number of pieces of data and the number of pieces of stuff to be accommodated in a frame accommodating portion based on a difference between a bit rate of an accommodated signal and a bit rate of a frame signal that accommodates the signal, and inserts the pieces of data and the pieces of stuff into the frame accommodating section. The details will be described below.

Each of the ODTU processing sections 30 generates an ODTU frame from the frame signal in which data and stuff have been inserted in the GMP processing section 20. The ODTUG4 processing section 40 multiplexes the ODTU frames generated in the respective ODTU processing sections 30, thereby generating an ODTUG4 frame. The OPU4 processing section 50 generates an OPU4 frame from the ODTUG4 frame. The ODU4 processing section 60 generates an ODU4 frame from the OPU4 frame. The OTU4 processing section 70 generates an OTU4 frame from the ODU4 frame and transmits the OTU4 frame to the optical transmission/reception interface section 300.

Figure 11A:
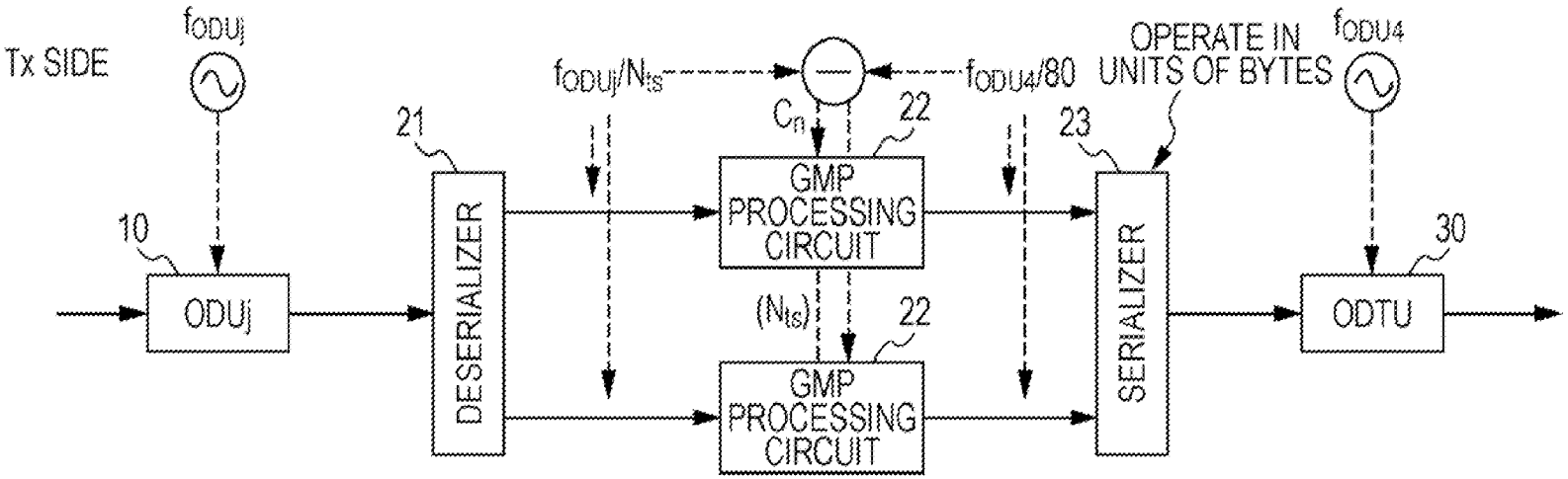
FIGS. 11A and 11B are block diagrams illustrating a GMP processing section.
Figure 11B:
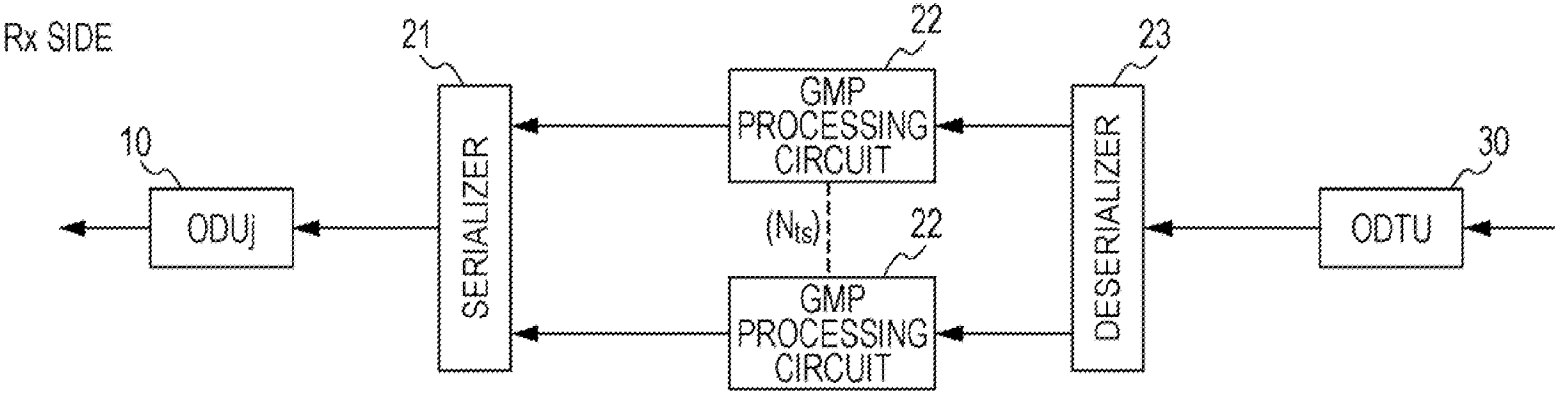

FIGS. 11A and 11B are block diagrams illustrating the details of the GMP processing section 20. The GMP processing section 20 includes a deserializer 21, a plurality of GMP processing circuits 22, and a serializer 23. The deserializer 21 interleaves an ODUj signal in units of bytes. In this embodiment, the deserializer 21 deserializes the ODUj signal into parallel signals, the number of which corresponds to the number of tributary slots used in an ODTU frame. That is, the deserializer 21 parallelizes the ODUj signal in units of tributary slots. The number of GMP processing circuits 22 included in the GMP processing section 20 corresponds to the number of tributary slots. In this embodiment, 80 types of tributary slots are used and thus the GMP processing section 20 includes 80 GMP processing circuits 22.

In this case, the operation speed required for each of the GMP processing circuits 22 is equivalent to or lower than the bit rate of the ODTU frame in which the ODUj signal is accommodated. In this embodiment, the operation speed required for each of the GMP processing circuits 22 may be about 1.25 Gbps. A bit rate deviation is the same in all the channels after the deserializer 21, and thus a Cn value for GMP is the same. Therefore, for mapping ODUj signal into ODTU frame that is occupied by m tributary slots of OTU, m GMP processing circuits use the same Cn value.

The GMP processing circuit 22 inserts data into a frame accommodating portion of an ODTU frame when the following expression (1) is satisfied, and inserts stuff into the frame accommodating portion when the following expression (2) is satisfied.

$$N \times Cn \bmod (\text{the total number of bytes in a signal accommodating portion}) < Cn \quad (1)$$

$$N \times Cn \bmod (\text{the total number of bytes in a signal accommodating portion}) \geq Cn \quad (2)$$

N: an address assigned to the frame accommodating portion of the ODTU frame

Cn: (the bit rate of the ODUj signal)/(the bit rate of the ODTU frame)×(the total number of bytes in the frame accommodating portion of the ODTU frame)

mod: an operator for calculating a remainder (modulo)

In this case, the number of pieces of stuff to be inserted into the signal accommodating portion of the ODTU frame may be calculated by subtracting Cn from the total number of bytes in the signal accommodating portion. Next, the number of pieces of stuff when the above expression (2) is satisfied will be described. For example, a description will be given about accommodating ODU0 in OPU4 by using one set of tributary slots (TS). In this case, the total number of bytes (B) in the signal accommodating portion in 1TS is 15200. The number of TS's (Nts) used for accommodation is 1. The bit rate (fc) of ODU0 is 1.244160000 Gbps (typical value). The bit rate (fs) of 1TS in OPU4 is 1.301709251 (typical value). Thus, the number of bytes to be accommodated Cn is 14528 according to the following expression (3). In expression (3), "Int" indicates rounding up the number after the decimal point.

$$Cn = Int((fc/Nts)/fs \times B) = Int(1.244160000/1)/1.301709251 \times 15200) = 14528 \quad (3)$$

The above example shows mapping ODUj (j=0) into ODTU with a tributary slot occupation of OTU. For the case of mapping ODUj into ODTU that is occupied m tributary slots of OTU, m GMP processing circuits are uses with same Cn value. Therefore, data of ODUj or stuff are inserted into ODTU frame with m granularity manner.

Figure 12A:
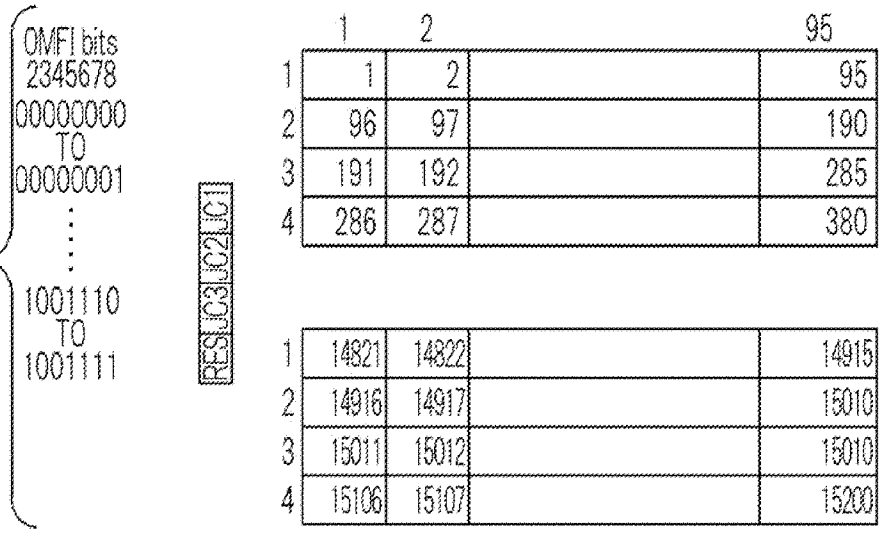
FIGS. 12A and 12B are diagrams illustrating addresses assigned to a frame accommodating portion of an ODTU frame.

Next, addresses assigned to the frame accommodating portion of the ODTU frame will be described with reference to FIGS. 12A and 12B. The addresses are sequentially assigned in accordance with the number of TS's in each row of each signal accommodating portion. Referring to FIG. 12A, when the number of TS's is 1, addresses are sequentially assigned in each row of the signal accommodating portion.

Figure 12B:
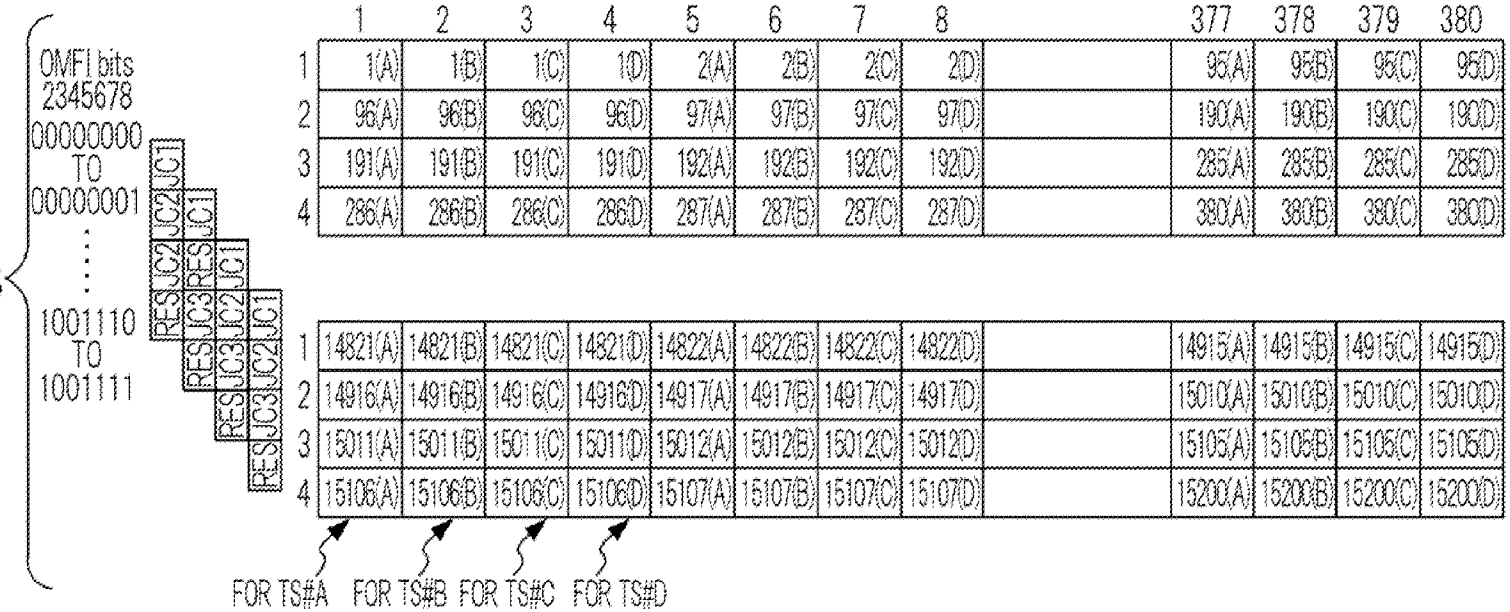

Referring to FIG. 12B, when the number of TS's is 4, addresses are sequentially assigned in units of four columns in each row of the signal accommodating portion. Specifically, addresses 1A to 1D for tributary slots A to D, where A<B<C<D, are sequentially assigned to the 1st to 4th columns of the signal accommodating portion. Likewise, addresses 2A to 2D for tributary slots A to D, where A<B<C<D, are sequentially assigned to the 5th to 8th columns of the signal accommodating section. That is, when "n" number of TS's is used, addresses are assigned to concatenate ODTU of 1TS by n.

Figure 13:
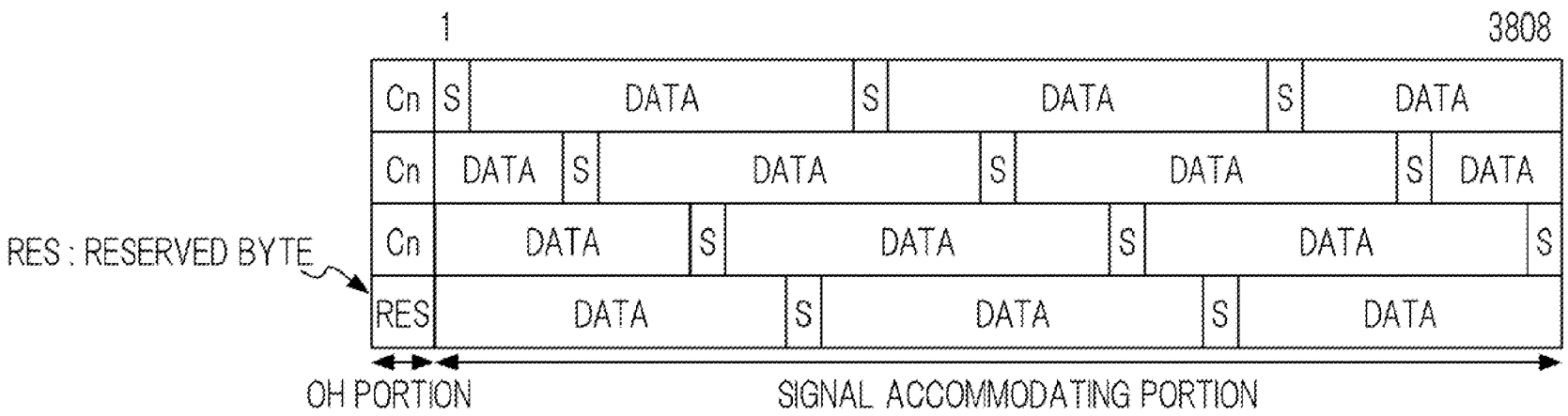
FIG. 13 is a diagram illustrating stuff bytes inserted into a signal accommodating portion in accordance with an expression.

FIG. 13 is a diagram illustrating stuff bytes inserted into the signal accommodating portion in accordance with the above expression (2). In FIG. 13, "S" corresponds to a stuff byte. As illustrated in FIG. 13, stuff bytes are inserted into the signal accommodating portion in a dispersed manner. Accordingly, jitter may be effectively suppressed when stuff bytes are removed in a receiver side compared to when stuff bytes are continuously inserted.

Figure 14A:
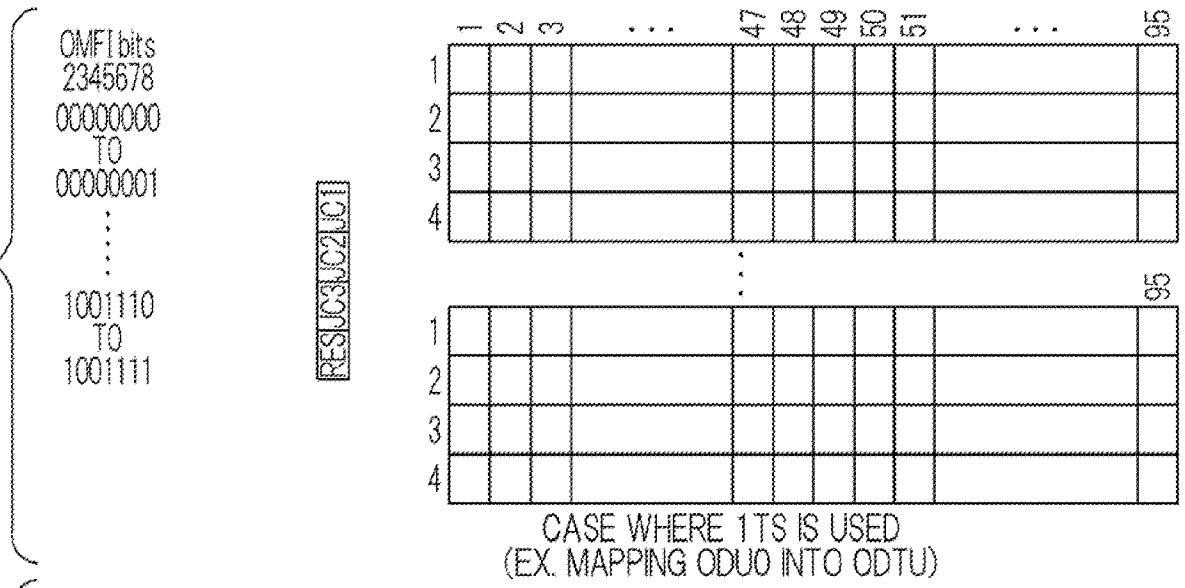
FIGS. 14A and 14B are diagrams illustrating storage of information for GMP in an ODTUOH unit.
Figure 14B:
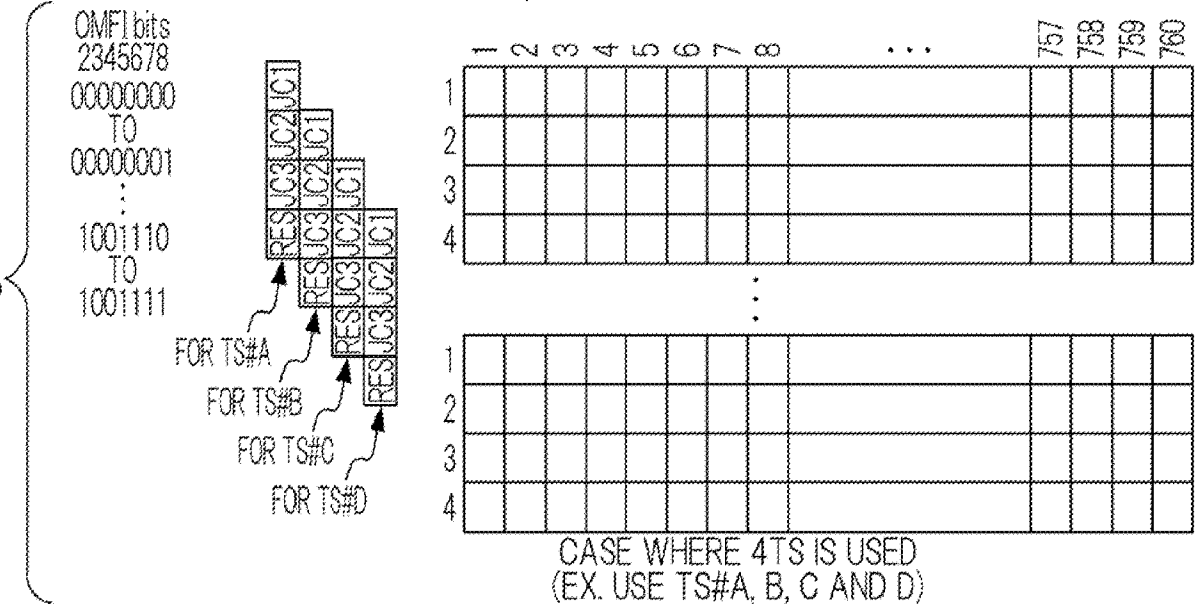

FIGS. 14A and 14B are diagrams illustrating storage of information for GMP in an ODTU OH unit. Referring to FIG. 14A, when 1TS is used, overhead information for the TS is given to an ODTU frame. Referring to FIG. 14B, when 4TS (TS#A to #D, where A<B<C<D) is used, overhead information for each TS is given to an ODTU frame. The overhead information includes information about the number of pieces of stuff calculated in the above expression (2). The information about the number of pieces of stuff is the same in the overhead corresponding to each TS.

Figure 15:
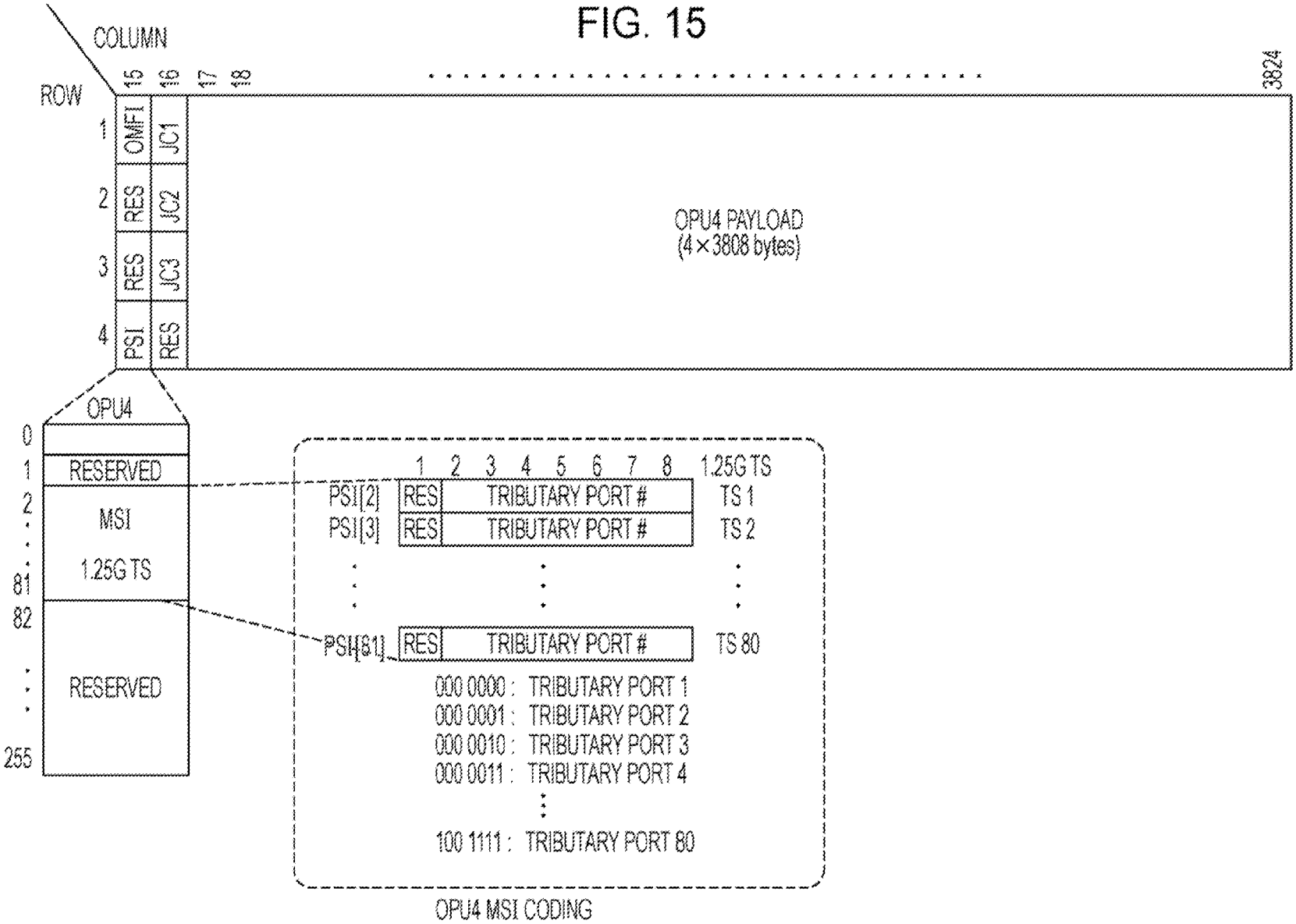
FIG. 15 is a diagram illustrating an example of an OPUkOH unit.

FIG. 15 is a diagram illustrating an example of an OPUk OH unit. Referring to FIG. 15, an OTU4/ODU4/OPU4 frame stores, in the 15th column and the 4th row, information indicating the correspondence between tributary slot numbers and tributary ports. Specifically, the OTU4/ODU4/OPU4 frame stores a signal for identifying port numbers of 80 tributary slots using seven bits. Accordingly, the number of tributary slots used for accommodating an ODUj signal in the OTU4/ODU4/OPU4 frame may be determined.

Figure 16:
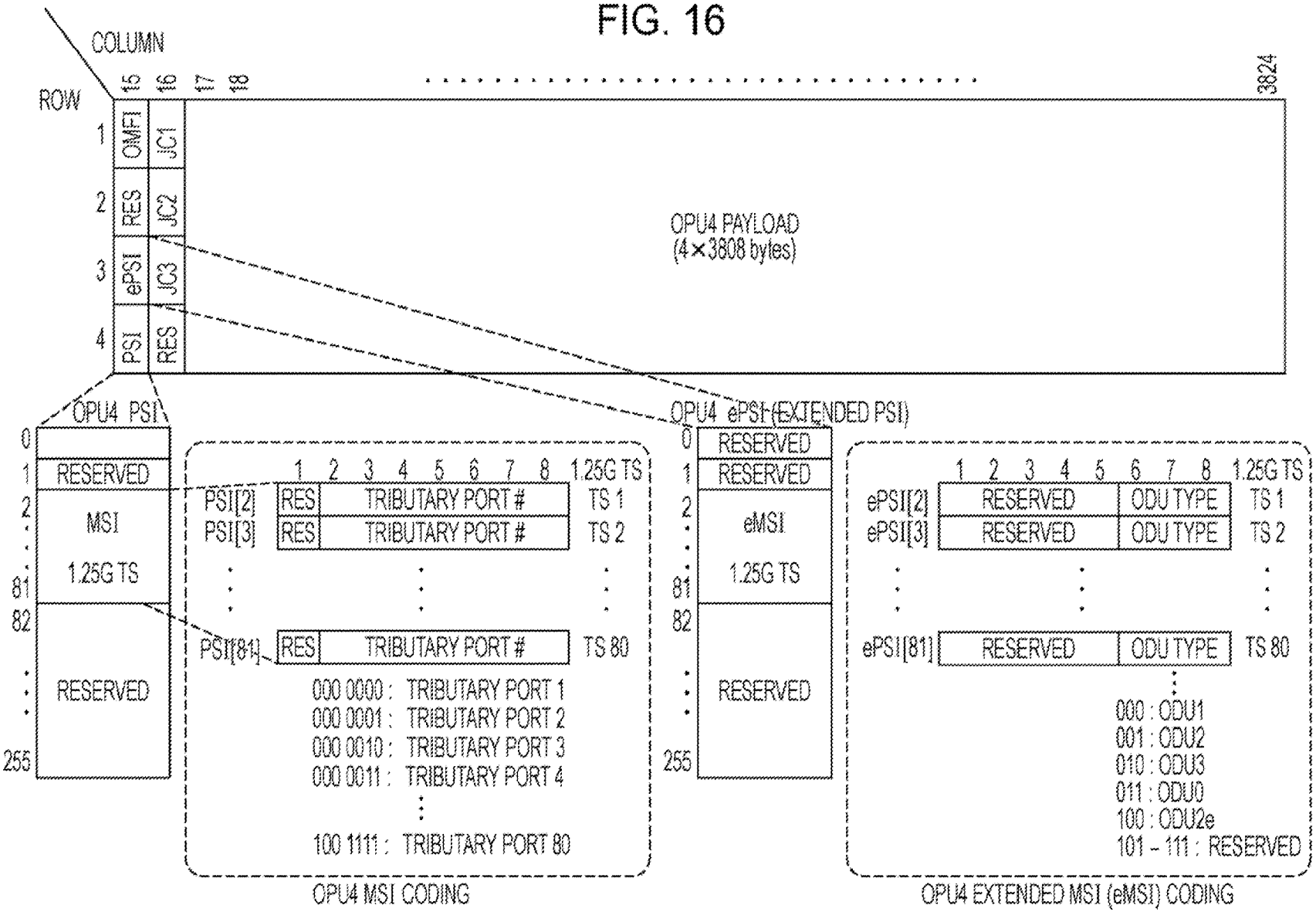
FIG. 16 is a diagram illustrating another example of an OPUkOH unit.

FIG. 16 is a diagram illustrating another example of the OPUk OH unit. The difference from the example illustrated in FIG. 15 is that the OTU4/ODU4/OPU4 frame stores, in the 15th column and the 3rd row, types of client signals accommodated in respective tributary slots (ODU0, ODU1, ODU2, ODU3, and ODU2e). By having this type of OH, the types of accommodated client signals may be identified.

In this embodiment, a description has been given about frame generation for transmitting a client signal having a bit rate under 100 Gbps at a bit rate of 100 Gbps. However, this embodiment is not limited thereto. This embodiment may also be applied to frame generation for transmitting a low-bit-rate client signal at a higher bit rate. In this case, too, an operation speed required for a GMP circuit may be decreased by deserializing a client signal into parallel signals the number of which corresponds to the number of multiple frames of an ODTU frame.

In this embodiment, the number of tributary slots in each set is 80, but the number is not limited thereto. In this case, when the number of GMP processing circuits 22 is the same as the number of tributary slots in each set, an advantage of this embodiment may be obtained.

An embodiment of the present invention has been described in detail. The present invention is not limited to this specific embodiment, and various modifications and changes are acceptable within the scope of the present invention described in the following claims.

According to the frame generating apparatus and frame generating method disclosed in the specification, ODTU frames applicable to the GMP method may be generated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A frame generating apparatus that [accommodates] *maps* a client signal [in] *into* an optical data transfer unit frame [with a higher bit rate than the client signal], the frame generating apparatus comprising:

[a deserializer that deserializes the client signal into M parallel signals where M is corresponding to the number of tributary slots used in the optical data transfer unit frame;]

[M generic mapping procedure circuits that inserts] *circuitry configured to map a group of M successive bytes of the client signal into a group of M successive bytes of the optical data transfer unit frame, wherein M is the number of tributary slots of the optical data transfer unit* frame [data and stuff into a frame accommodating portion of the optical data transfer unit frame based on a difference in the bit rate between the client signal and the optical data transfer unit frame]; and

[a serializer that serializes the M parallel signals output from M generic mapping procedure circuits,]

wherein [M generic mapping procedure circuits that in accordance with an address] *the circuitry* inserts data into [the] *a* frame accommodating portion of the optical data transfer unit frame when a first expression (N×Cn) mod Tb<Cn is satisfied, and inserts stuff into the frame accommodating portion of the optical data transfer unit frame when a second expression (N×Cn) mod Tb≥Cn is satisfied, "N" representing the address assigned to the frame accommodating portion of the optical data transfer unit frame, "Cn" representing (a bit rate of the client signal)÷(a bit rate of the optical data transfer unit frame)×[(the total number of bytes in the frame accommodating portion of the optical data transfer unit frame)](*a total number of bytes in the frame accommodating portion of the optical data transfer unit frame*), "Tb" representing the total number of bytes in a signal accommodating portion *of the optical data transfer unit frame*, and "mod" representing a remainder operator.

2. The frame generating apparatus according to claim 1, further comprising:

an optical data transfer unit generator accommodating a signal from the [serializer] *circuitry* in the optical data transfer unit frame, wherein the frame accommodating portion includes a plurality of rows, and wherein the optical data transfer unit generator sequentially assigns addresses in accordance with the number of tributary slots in each row of the frame accommodating portion.

3. The frame generating apparatus according to claim 2, wherein the optical data transfer unit generator accommodates the signal from the [serializer] *circuitry* in the optical data transfer unit frame by regarding two types of optical data transfer unit frames of eighty types of optical data transfer unit frames as one set and forty sets of the optical data transfer unit frames as one multiframe cycle.

[4. A frame generating method for accommodating a client signal in an optical data transfer unit frame with a higher bit rate than the client signal, the method comprising:

deserializing, by an apparatus, the client signal into parallel signals, the number of parallel signals corresponding to the number of tributary slots used in the optical data transfer unit frame;

inserting, by an apparatus, data and stuff into a frame accommodating portion of the optical data transfer unit frame based on a difference in bit rate between the client signal and the optical data transfer unit frame; and serializing, by an apparatus, the parallel signals after inserting data and stuff into the frame accommodating portion of the optical data transfer unit frame, wherein data is inserted into the frame accommodating portion of the optical data transfer unit frame in accordance with an address when a first expression (N×Cn) mod Tb<Cn is satisfied, and stuff is inserted into the frame accommodating portion in accordance with an address when a second expression (N×Cn) mod Tb>Cn is satisfied, "N" representing the address assigned to the frame accommodating portion of the optical data transfer unit frame, "Cn" representing (a bit rate of the client signal)÷(a bit rate of the optical data transfer unit frame)×(the total number of bytes in the frame accommodating portion of the optical data transfer unit frame), "Tb" representing the total number of bytes in a signal accommodating portion, and "mod" representing a remainder operator.]

[5. The method according to claim 4, wherein stuff is inserted into the frame accommodating portion of the optical data transfer unit frame in a dispersed manner.]

[6. The method according to claim 4, further comprising:

accommodating a signal from the serializer in the optical data transfer unit frame, wherein the frame accommodating portion includes a plurality of rows, and wherein addresses are sequentially assigned in accordance with the number of tributary slots in each row of the frame accommodating portion in accommodating the signal from the serializer.]

[7. The method according to claim 6, wherein accommodating the signal from the serializer in the optical data transfer unit frame by regarding two types of optical data transfer unit frames of eighty types of optical data transfer unit frames as one set and forty sets of the optical data transfer unit frames as one multi-frame cycle.]

[8. The method according to claim 4, further comprising:

generating an optical transfer unit frame by multiplexing the plurality of optical data transfer unit frames, wherein tributary slots have corresponding tributary port numbers, and wherein the tributary port numbers corresponding to tributary slots are stored in an optical channel payload unit overhead in generating an optical transfer unit frame.]

[9. The method according to claim 8, wherein a type of the client signal is further stored in the optical channel payload unit overhead in generating an optical transfer unit frame.]

[10. A frame generating apparatus comprising:

a deserializer that deserializes a client signal into parallel signals, the number of parallel signals corresponding to the number of tributary slots used in a optical data transfer unit frame; and a plurality of generic mapping procedure circuits that in accordance with an address inserts data into a frame accommodating portion of the optical data transfer unit frame when a first expression (N×Cn) mod Tb<Cn is satisfied, and inserts stuff into the frame accommodating portion of the optical data transfer unit frame when a second expression (N×Cn) mod Tb≥Cn is satisfied, "N" representing the address assigned to the frame accommodating portion of the optical data transfer unit frame, "Cn" representing (a bit rate of a client signal) ÷(a bit rate of the optical data transfer unit frame)÷(the total number of bytes in the frame accommodating portion of the optical data transfer unit frame), "Tb" representing the total number of bytes in a signal accommodating portion, and "mod" representing a remainder operator.]

11. A frame generating apparatus that accommodates a client signal in an optical data transfer unit frame with a higher bit rate than the client signal, the frame generating apparatus comprising:

[a generic mapping procedure circuit] *circuitry* that inserts data or stuff into a frame accommodating portion of the optical data transfer unit frame based on a difference in the bit rate between the client signal and the optical data transfer unit frame and maps a group of M successive bytes of the client signal into a group of M successive bytes of the optical data transfer unit frame, where M is the number of tributary slots of the optical data transfer unit frame; and wherein the [generic mapping procedure circuit that] *circuitry* in accordance with an address inserts data into the frame accommodating portion of the optical data transfer unit frame when a first expression (N×Cn) mod Tb<Cn is satisfied, and inserts stuff into the frame accommodating portion of the optical data transfer unit frame when a second expression (N×Cn) mod Tb≥Cn is satisfied, "N" representing the address assigned to the frame accommodating portion of the optical data transfer unit frame, "Cn" representing (a bit rate of the client signal)÷(a bit rate of the optical data transfer unit frame)×[(the total number of bytes in the frame accommodating portion of the optical data transfer unit frame)](*a total number of bytes in the frame accommodating portion of the optical data transfer unit frame*), "Tb" representing the total number of bytes in a signal accommodating portion, and "mod" representing a remainder operator.

12. The frame generating apparatus according to claim 11, wherein the client signal is optical data unit (ODU) and the optical data transfer unit frame is optical data transfer unit (ODTU).

13. The frame generating apparatus according to claim 11, wherein the optical data transfer unit frame is optical data payload unit (OPU) and the client signal is a signal with a lower bit rate than the OPU.

14. The frame generating apparatus according to claim 11, wherein the optical data transfer unit frame is optical data payload unit (OPU) and the client signal is Ethernet signal.

15. The frame generating apparatus according to claim 11, wherein the [generic mapping procedure circuits] *circuitry* insert stuff into the frame accommodating portion of the optical data transfer frame in a dispersed manner.

16. The frame generating apparatus according to claim 11, further comprising:

an optical data transfer unit generator accommodating a client signal in the optical data transfer unit frame, wherein the frame accommodating portion includes a plurality of rows, and wherein the optical data transfer unit generator sequentially assigns addresses in accordance with M in each row of the frame accommodating portion, where M is the number of tributary slots of the optical data transfer unit frame.

17. The frame generating apparatus according to claim 11, further comprising:

an optical frame unit frame generator generating an optical transfer unit frame, wherein tributary slots have corresponding tributary port numbers, and wherein the optical transfer unit frame generator stores the tributary port numbers corresponding to the tributary slots in an optical channel payload unit overhead.

18. The frame generating apparatus according to claim 17, wherein the optical transfer unit frame generator further stores a type of the client signal in the optical channel payload unit overhead.

*19. The frame generating apparatus according to claim 1, wherein the circuitry includes:*

*a deserializer configured to receive the client signal and output the client signal in parallel, and*

*M generic mapping procedure circuits coupled to the deserializer and configured to receive the client signal from the deserializer respectively.*

*20. The frame generating apparatus according to claim 19, wherein the circuitry includes:*

*a serializer coupled to the M generic mapping procedure circuits and configured to output the optical data transfer unit frame accommodating the client signal.*

*21. The frame generating apparatus according to claim 11, wherein the circuitry includes:*

*a deserializer configured to receive the client signal and output the client signal in parallel, and*

*M generic mapping procedure circuits coupled to the deserializer and configured to receive the client signal from the deserializer respectively.*

*22. The frame generating apparatus according to claim 21, wherein the circuitry includes:*

*a serializer coupled to the M generic mapping procedure circuits and configured to output the optical data transfer unit frame accommodating the client signal.*

* * * * *